(12) United States Patent
Bos et al.

(10) Patent No.: US 6,717,610 B1
(45) Date of Patent: Apr. 6, 2004

(54) WIDE ANGLE IMAGE CAPTURE SYSTEM FOR VEHICLE

(75) Inventors: Brent J. Bos, Tucson, AZ (US); Kenneth Schofield, Holland, MI (US); Mark L. Larson, Grand Haven, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/199,907

(22) Filed: Nov. 25, 1998

(51) Int. Cl.[7] .............................. H04N 7/18; H04N 9/47
(52) U.S. Cl. ........................ 348/148; 340/436; 340/901; 348/30; 348/335
(58) Field of Search ......................... 348/148, 30, 335; 340/436, 901

(56) References Cited

U.S. PATENT DOCUMENTS

| | | | | |
|---|---|---|---|---|
| 3,947,095 | A | | 3/1976 | Moultrie ...................... 350/302 |
| 4,214,266 | A | | 7/1980 | Myers ......................... 358/108 |
| 4,264,144 | A | * | 4/1981 | McCord ....................... 350/293 |
| 4,277,804 | A | | 7/1981 | Robison ....................... 358/108 |
| 4,626,850 | A | | 12/1986 | Chey ............................ 340/903 |
| 4,892,345 | A | | 1/1990 | Rachael, III ................. 296/24.1 |
| 4,937,796 | A | | 6/1990 | Tendler ....................... 367/116 |
| 5,121,200 | A | | 6/1992 | Choi ............................. 358/103 |
| 5,406,395 | A | | 4/1995 | Wilson et al. ................. 359/15 |
| 5,414,461 | A | | 5/1995 | Kishi et al. .................. 348/115 |
| 5,574,443 | A | * | 11/1996 | Hsieh ........................... 340/601 |
| 5,648,835 | A | | 7/1997 | Uzawa ......................... 396/429 |
| 5,670,935 | A | | 9/1997 | Schofield et al. ........... 340/461 |
| 5,680,123 | A | * | 10/1997 | Lee ............................... 340/937 |
| 5,760,826 | A | * | 6/1998 | Nayar ........................... 348/36 |
| 5,760,828 | A | | 6/1998 | Cortes ......................... 348/143 |
| 5,793,542 | A | | 8/1998 | Kondo et al. ............... 359/864 |
| 5,796,094 | A | | 8/1998 | Schofield et al. ......... 250/208.1 |
| 6,115,651 | A | * | 9/2000 | Cruz ............................... 701/1 |
| 6,175,300 | B1 | * | 1/2001 | Kendrick .................... 340/436 |
| 6,226,035 | B1 | * | 5/2001 | Korein ......................... 348/355 |
| 6,304,285 | B1 | * | 10/2001 | Geng ............................ 348/36 |

FOREIGN PATENT DOCUMENTS

| | | |
|---|---|---|
| DE | 2931368 A1 | 2/1981 |
| DE | 3248511 A1 | 7/1984 |
| EP | 0416222 A2 | 3/1991 |
| EP | 0513476A A1 | 11/1992 |
| FR | 2241085 | 3/1975 |
| FR | 25285991 | 2/1987 |
| FR | 2673499 | 9/1992 |

(List continued on next page.)

OTHER PUBLICATIONS

Commonly assigned, co–pending U.S. patent application, Ser. No. 08/952,026 Filed Nov. 19, 1997 by Schofield et al., entitled Rearview Vision System For Vehicle Including Panoramic View.

(List continued on next page.)

*Primary Examiner*—Andy Rao
*Assistant Examiner*—Charles Parsons
(74) *Attorney, Agent, or Firm*—Van Dyke, Gardner, Linn & Burkhart, LLP (57) ABSTRACT

A wide-angle image capture system for providing a wide-angle field of view of an area immediately exteriorly of a vehicle. The system includes a convex aspheric, asymmetric reflective surface which reflects an image toward an image capture device, via a substantially flat mirrored surface, both of which are compactly packaged within a panel of the vehicle. The shape of the convex reflector provides a reflected image that has a minimal amount of distortion in critical areas of the image immediately adjacent to the vehicle, so that additional processing of the image prior to it being displayed to a vehicle operator is minimized.

46 Claims, 5 Drawing Sheets

FOREIGN PATENT DOCUMENTS

| | | | |
|---|---|---|---|
| GB | 934037 | 8/1963 | ................ 358/108 |
| GB | 2137573 A | 10/1984 | |
| GB | 2244187 A | 11/1991 | |
| GB | 2327823 A | 3/1999 | |
| JP | 55039843 | 3/1980 | ................ 358/103 |
| JP | 58210635 | 12/1983 | |
| JP | 62122487 | 6/1987 | |
| JP | 62122844 | 6/1987 | ................ 358/108 |
| JP | 30061192 | 3/1991 | |
| JP | 50000638 | 1/1993 | |
| WO | WO 9616839 | 11/1995 | ............ B60R/1/06 |
| WO | 9638319 | 12/1996 | |

OTHER PUBLICATIONS

Commonly assigned, co–pending U.S. patent application, Ser. No. 08/935,336 Filed Sep. 22, 1997 by Schofield et al., entitled Display Enhancement For Vehicle Vision System.

Hamit, Francis "360–Degree Interactivity: New Video and Still Cameras Provide a Global Roaming Viewpoint", *Advanced Imaging*, Mar. 1997, p. 50.

Johannes, Laura "A New Microchip Ushers in Cheaper Digital Cameras", *The Wall Street Journal*, Aug. 21, 1998, p. B1.

\* cited by examiner

WIDE ANGLE IMAGE CAPTURE SYSTEM FOR VEHICLE

BACKGROUND OF THE INVENTION

This invention relates generally to rear-view vision systems for vehicles and, more particularly, rear-view vision systems which provide the vehicle operator with wide angle scenic information of the area immediately rearward of the vehicle, typically while the vehicle is traveling in reverse.

A long felt need in the art of vehicle rear-view systems has been to provide the vehicle operator with wide angle scenic information of the area directly rearward of the vehicle, particularly when the vehicle is traveling in reverse. Neither interior rear-view mirrors nor side exterior mirrors allow for visibility of the area immediately rearward of the vehicle's bumper, which is the information most critical to the vehicle operator when backing up. Therefore, various camera-based rear view vision systems have been proposed to provide visibility of this blind spot.

To date, camera-based rear vision systems for vehicles backing up have not obtained widespread commercial acceptance. In one form of these systems, a camera with a standard lens is located on the rearward portion of the vehicle to provide a view of the area behind the vehicle. However, a standard lens fails to capture a wide-angle view of the area, thus failing to provide the vehicle operator with an image of the entire critical area directly rearward of the vehicle.

In order to provide a wider angle view of the rearward area, a wide-angle lens system may be used with the camera to capture the critical area. While this provides a broader field of view and thus may include the critical area immediately rearward of the vehicle, the wide-angle lens results in extreme field curvature and a greatly distorted image of the area. Additional lenses are required to correct the distortion, further adding to the cost and complexity of the system. Because the wide-angle lens and the additional corrective lenses are typically precision optics, not only is the initial cost to manufacture and implement them very high, but so is the cost to replace them, should they be damaged or broken on the vehicle in the vulnerable area in which they are typically located.

Another difficulty with the proposed multi-element lens and camera systems is that they are difficult to package within the small area available at the rearward portion of the vehicle. These systems are typically assembled as a horizontal cylindrical column and positioned within the trunk lid or rear panel of the vehicle, which results in the camera system protruding forward into the trunk space. Generally, it is desirable to avoid installing any components which extend into the trunk space other than those necessary for the opening and closing of the trunk lid and those that can easily be packaged along the floor or sides of the vehicle within the trunk space, such that the overall trunk space is maximized. It is undesirable to package components within this space not only because trunk space is considered valuable to consumers, but also because consumers tend to over-pack their trunk spaces, and then force the trunk lid closed, resulting in damage to any components trapped between the packed items and the trunk lid. These camera systems are also undesirable for use in a van, pick-up truck or the like, where the cylindrical column would extend forward into an open space, and also be prone to damage.

Another concern with the multiple element systems is that they are very susceptible to the image received being adversely affected by stray light. Because the lens is positioned at the rear panel of the vehicle, it receives light from all rearward directions. While only the light representing the rearward image is directed toward the camera, other light may enter the cylindrical column of lenses and reflect from the multiple elements within the column, causing additional aberrations and, glare in the received image.

SUMMARY OF THE INVENTION

The present invention is directed toward enhancing visibility to the driver of a vehicle by providing a low-distortion, relatively low-cost wide-angle field of view of the area directly exteriorly of a vehicle which is capable of being compactly packaged within a portion of the vehicle.

This is accomplished according to an aspect of the present invention by a vehicular vision system having a reflector which is positionable on a portion of a vehicle. The reflector reflects an image of a view exteriorly of the vehicle, which is received by an image capture device. A display system displays a low-distortion image from an output of the image capture device.

According to another aspect of the present invention, the vision system may comprise an asymmetric image capturing system that asymmetrically captures an image of an area exteriorly of a vehicle. A display positioned within the vehicle displays an image from an output of the asymmetric image capturing system.

According to another aspect of the present invention, the vision system may be compactly packaged by positioning a substantially flat mirrored reflective surface along an optic path between the reflector and image capture device, such that the reflective surface redirects the image reflected from the reflector toward the image capture device. Reflecting the image in such a manner allows the system to be packaged in a very small area within a panel of the vehicle, thereby avoiding the necessity of a deep recess into the vehicle body and greatly reducing the overall amount of space taken up within the vehicle.

According to yet another aspect of the present invention, a convex reflector and the image capture device define an optical path therebetween and are oriented relative to one another such that the optical path is directed off of an axis of the convex reflector. By orienting the image capture device off-axis, the image capture device receives an image reflected from the convex reflector that does not include a reflection of the image capture device itself. This reduces the amount of electronic processing required to correct the reflective image as the image capture device does not have to be removed from the image, while also avoiding a blind spot in the image that results from the removal of the image capture device reflection. Also, this allows the image capture device to be positioned within the vehicle body where it is not exposed to the elements.

According to another aspect of the present invention, the vision system may include an image capture device that is adapted to reduce distortion of the image reflected by the reflector. The display system displays an image synthesized from an output of the image capture device such that the display system in combination with the image capture device reduces image distortion. This may be accomplished by the image capture device receiving the reflected image on an array made of a non-uniform distribution of a plurality of imaging pixels. The non-uniform distribution corresponds to the distortion in the reflected image such that when the display system receives and displays the image on a substantially uniform array, a substantially non-distorted image of a view rearward of the vehicle is displayed to a vehicle operator.

A convex reflector according to another aspect of the invention is both asymmetric relative an axis and aspheric to minimize distortion and aberrations in critical areas of the image reflected, yet still provides a broad field of view to the vehicle operator. The shape of the convex reflector according to another aspect of the invention has varying radii of curvature in both longitudinal and lateral directions, such that the convex reflector is of a shape that minimizes distortion in the reflected image and produces a desired field of view. Preferably, a field of view is produced that is approximately 140° horizontal and approximately 60° vertical. This field of view encompasses areas surrounding the rear of the vehicle without capturing sky and other irrelevant information.

According to still yet another aspect of the present invention, an image capture system may capture discontinuous images of scenic information exteriorly of the vehicle. A display then displays a substantially non-distorted image of the scenic information communicated from the image capture system. The image capture system may include two reflectors and may further include two image capture devices.

The present invention may be packaged within the small space constraints of the trunk of a vehicle, and is much less costly to manufacture due to the small number of components and the simplicity of the design of each component. The present invention may also eliminate extensive electronic processing and additional lenses to correct for excessive distortion and aberrations within the image before it is displayed to the vehicle operator. In this manner, the present invention provides a low cost system which produces a maximum field of view with a minimal amount of distortion and aberrations.

These and other objects, advantages, and features of this invention will become apparent upon review of the following specification in conjunction with drawings.

DESCRIPTION OF THE PREFERRED EMBODIMENT

Figure 1:
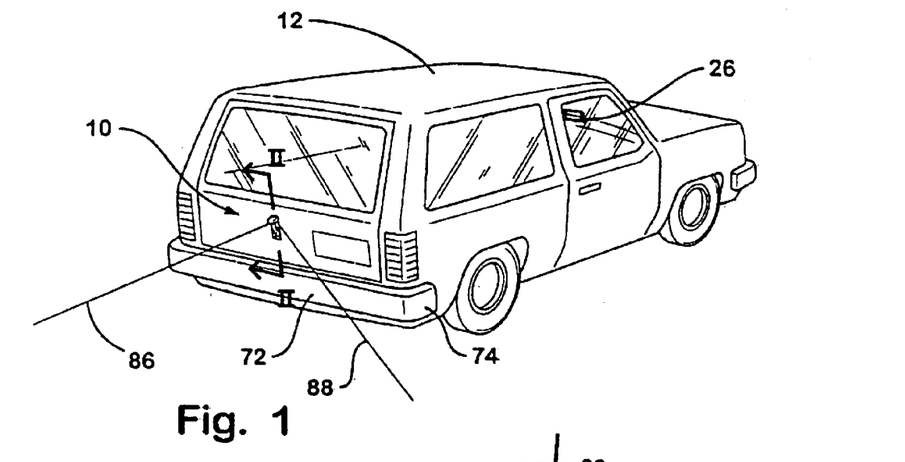
FIG. 1 is a rear perspective view of an automobile according to the invention.
Figure 2:
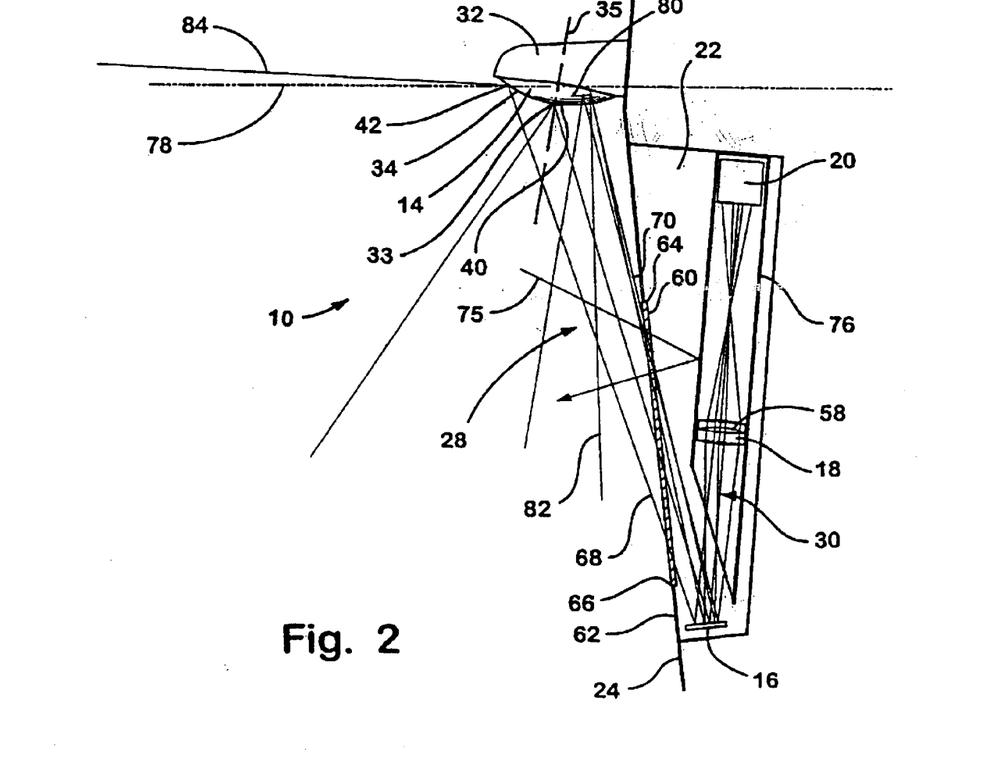
FIG. 2 is a cross-sectional view along-the line II—II in FIG. 1.

Referring now to the drawings and the illustrative embodiments depicted therein, a wide-angle image capture system, generally illustrated at 10, provides an operator of a vehicle 12 with scenic information of an area immediately exteriorly, and preferably rearward, of vehicle 12, which may be an automobile, a light truck, a van, a large truck, a sport utility vehicle, or the like. Image capture system 10 includes a reflector 14 which is preferably substantially bent outwardly or convex and an image capture device 20 compactly packaged within a recess 22 in a rear panel 24 of vehicle 12, thereby minimizing the trunk space required, as shown in FIG. 2. Image capture system 10 may further include a substantially flat reflective surface or mirror 16 and a diffractive lens 18. As the image is received by image capture device 20, the image is electronically communicated to a display screen 26 located within vehicle 12, where the image is displayed for the vehicle operator.

Convex reflector 14 reflects a reflected image, generally represented as lines 28, of the area exteriorly of vehicle 12, downward toward reflective surface 16. Reflective surface 16 may be positioned slightly within rear panel 24, and angled to redirect a reflected image 28 from convex reflector 14 substantially upward and slightly forward toward image capture device 20, which is correspondingly oriented along an optic path between image capture device 20 and convex reflector 14, to receive redirected image 30. The precise locations of image capture device 20 and reflective surface 16 are determined relative to convex reflector 14 such that the distance between convex reflector 14 and image capture device 20, via reflective surface 16, minimizes image aberrations while providing the required field of view. Diffractive lens 18, image capture device 20 and reflective surface 16 may all be positioned within rear panel 24 of vehicle 12, with diffractive lens 18 also being positioned along the optical path. Diffractive lens 18 provides color correction and may further provide image distortion correction to the image reflected and redirected toward image capture device 20. A redirected image, generally represented as lines 30, received by image capture device 20, is then electronically communicated to display 26, which displays the synthesized scenic information to the operator of vehicle 12. The image capture system 10 may be efficiently operated, such that image capture device 20 and/or display 26 are activated only when scenic information is desired by the driver. For example, the image capture device 20 and/or display 26 may be activated when the vehicle's reverse gear is engaged or may be driver activated, such as by voice activation or the like.

Convex reflector 14 is rigidly mounted to a protective housing or bracket 32 on rear panel 24 with its apex 33 directed substantially downwardly such that the reflector is convex downward. The image capture system may also be positioned in the detent area of the rear panel where a license plate is secured. Furthermore, the system may be included within the housing of a license plate lamp, or within a license plate frame or holder to ease an aftermarket application of the system. In a minivan, sport utility vehicle or the like, the system may be positioned within or immediately adjacent the rim molding of the rear window or backlight. The reflector may be positioned on an exterior surface of the window with the image capture device being within the vehicle, so that the reflected image is directed through the window to the image capture device. The orientation would be preferably similar to that of FIG. 2, with the rear panel 24 and transparent panel 60 combining to form the rear window of the vehicle.

Alternatively, an image capture system or even a refractive lens camera system may be mounted within a rear spoiler of a vehicle. This location not only allows the reflector or camera lens to be directed more directly downward, beyond the rear of the vehicle, but also allows for simplified installation of the system as an aftermarket device. Another embodiment of the present invention may position an image capture system reflector or camera lens within a vehicle logo or badge on the rear panel of the vehicle. When reverse is engaged by the driver, a motorized drive then moves the badge and the reflector or camera rearward to a position extending outward from the vehicle, in order to capture an exterior field of view from the vehicle. This orientation further protects the system when it is not in use and also allows the system to be moved substantially rearward or otherwise exteriorly when it is in use, so as to capture scenic information in a substantially downward direction.

Figure 13:
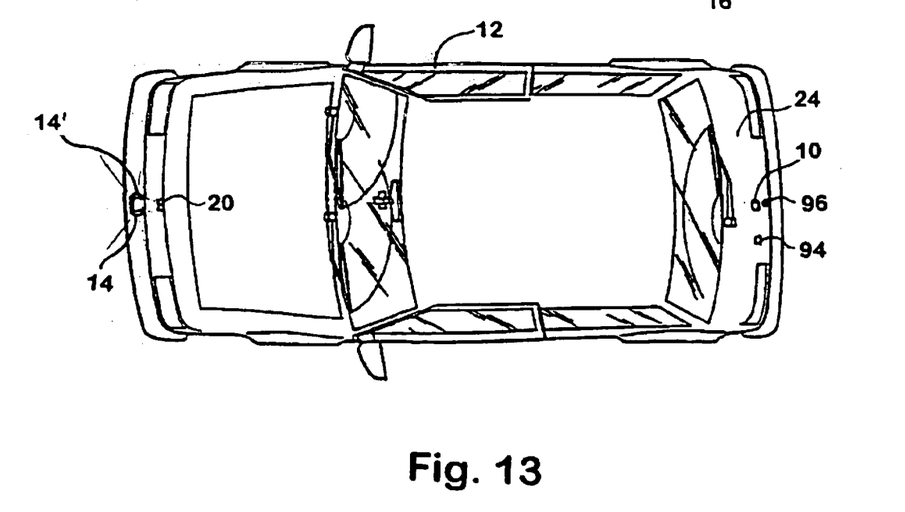
FIG. 13 is a top view of a vehicle incorporating another embodiment of the present invention.

Furthermore convex reflector 14 may be positioned elsewhere on the vehicle and directed so as to provide scenic information to the driver of other areas surrounding the vehicle, such as to one side or the other or both sides, of the vehicle. Additionally, a second convex reflector 14' may be implemented, with the two reflectors 14 and 14' being directed substantially opposite to one another to reflect discontinuous images toward one or more image capture devices (FIG. 13). This provides the driver of vehicle 12 with scenic information of both sides of the vehicle simultaneously. For example, the reflectors may be positioned at the front of the vehicle to provide information of the area immediately forward and to either side of vehicle 12. Such mounting and orientation schemes are not limited to the reflective system of the present invention, as one or more refractive lens cameras may be implemented as described above to provide exterior views from the vehicle.

Convex reflector 14 may be made compact, preferably being less than approximately 18 mm in diameter, and has a smooth curved reflective surface 34 which provides a broad field of view of the scene immediately rearward of vehicle 12. Curved reflective surface 34 of convex reflector 14 is preferably a metallized surface which may comprise a chromium, aluminum, silver, stainless steel, titanium or alloys thereof. The reflective surface 34 may be a first surface reflector or a second surface reflector. Because convex reflector 14 is positioned exteriorly of the vehicle, convex reflector 14 may be heatable to defog or defrost the reflective surface 34. Convex reflector 14 may therefore be formed by a glass coated with an indium tin oxide transparent conductor or a doped tin oxide, or may include a wire mesh or a conductive coating mesh. Furthermore, the outer surface of the outer cover or of convex reflector 14 itself may be coated with an anti-soiling or anti-wetting coating, such as a silicone material, which may provide either a hydrophobic or hydrophilic property to the reflector.

Figure 3:
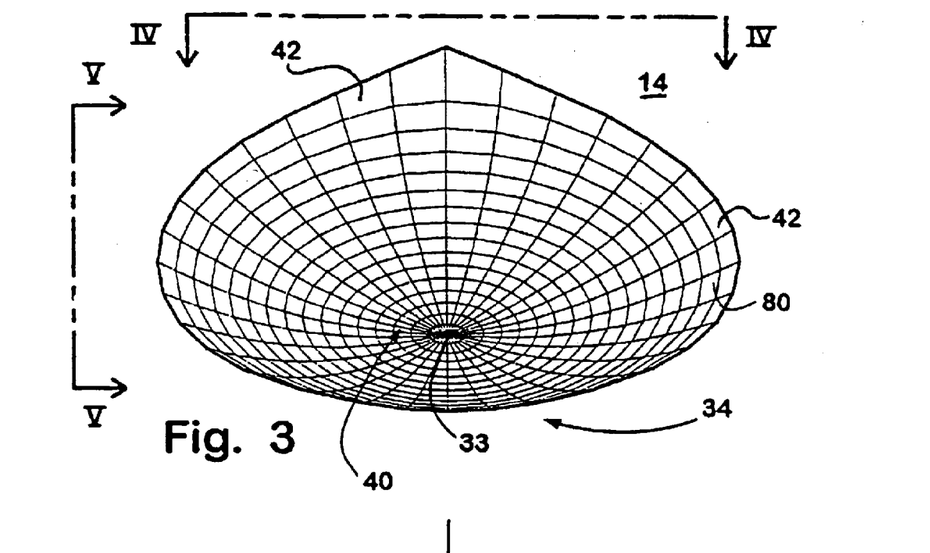
FIG. 3 is a perspective view of a convex reflector useful with a preferred embodiment.
Figure 10:
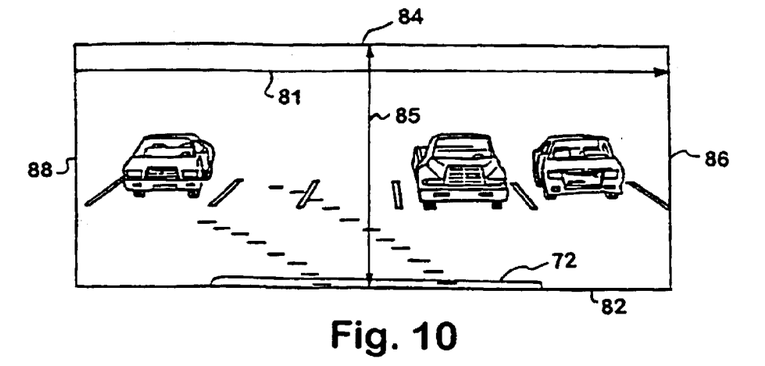
FIG. 10 is a view rearward of the vehicle captured and displayed by the present invention.

In the preferred embodiment, convex reflector 14 has a reflective surface 34 that is both aspheric and asymmetrical about a central axis 35, which passes through apex 33 and is normal to the surface at the apex. This configuration is designed to minimize distortion in the critical portions of the image reflected, while still providing a broad field of view in the horizontal direction which is larger than the field of view in the vertical direction. This is accomplished by the asymmetric shape and varying radii of curvature in both directions along curved surface 34, as best shown in FIG. 3. The radii of curvature preferably vary between approximately one inch and 200 inches along the curved surface 34 of the reflector 14. As shown in FIG. 10, the varying radii of curvature allow convex reflector 14 to provide a wide field of view horizontally, in order to capture scenic information around the vehicle, while providing less of a field of view vertically, to avoid capturing unnecessary and even distracting information. Preferably, the horizontal field of view, shown generally as 81, spans approximately 140 degrees, while the vertical field of view, shown generally as 85, spans only approximately 60 to 90 degrees, where the vertical field is limited to substantially below a horizontal plane passing through the reflector (FIG. 10).

Figure 4:
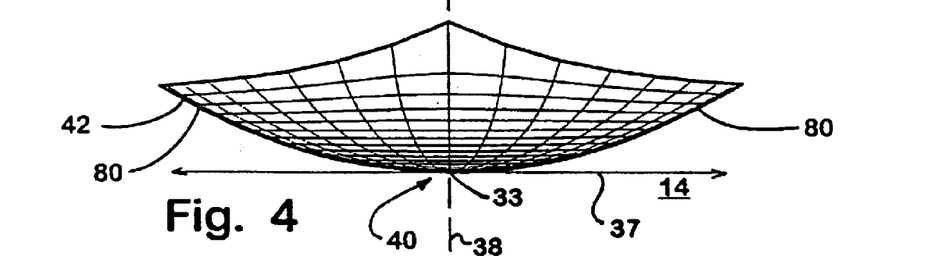
FIG. 4 is a side elevation taken along lines IV—IV in FIG. 3.
Figure 5:
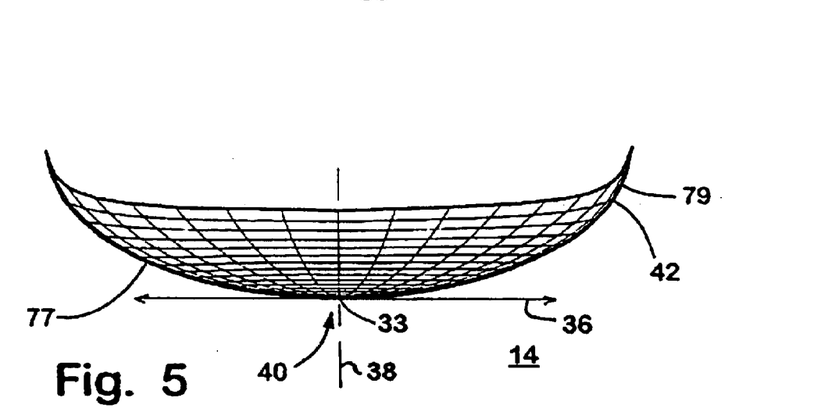
FIG. 5 is a side elevation taken lines V—V in FIG. 3.
Figures 6, 7:
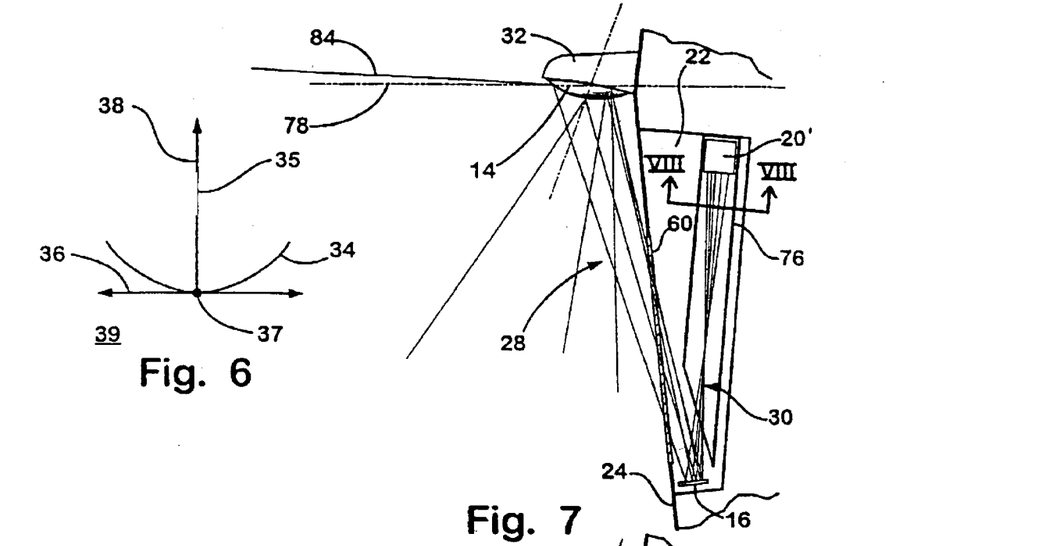
FIG. 6 is a schematic of the coordinate system corresponding to an equation that defines the surface of the convex reflector.
FIG. 7 is the same view as FIG. 2 of an alternate embodiment of the invention.

The geometry of convex reflector 14 may vary depending on its application, with an optimal equation being determined by implementing an algorithm to derive the equation and calculate the necessary constraints. The preferred geometry of convex reflector 14 is shown in FIGS. 3, 4 and 5 and defined by the mathematical equation:

$$z = \frac{c_x x^2 + c_y y^2}{1 + \sqrt{1 - (1+k_x)c_x^2 x^2 - (1+k_y)c_y^2 y^2}}; \quad c_x = \frac{1}{r_x}; \quad c_y = \frac{1}{r_y};$$

where x, y and z are coordinates on curved surface 34 along an x-axis 36, a y-axis 37 and a z-axis 38, respectively, $r_x$ is the radius of curvature of curved surface 34 along x-axis 36, $r_y$ is the radius of curvature along y-axis 37, and $k_x$ and $k_y$ are constants. A diagram of a coordinate system 39 for which these variables and constants apply is shown in FIG. 6, where z-axis 38 is along axis 35 of curved reflective surface 34. The resultant shape of convex reflector 14 is therefore hyperbolic, having different radii of curvature in both the x and y directions. As best shown in FIGS. 4 and 5, convex reflector 14 has larger radii of curvature in a center region 40 and smaller radii of curvature near its outer edges 42, thereby allowing the lens to reflect an image having less distortion in the center region than a paraboloid shaped reflector of a similar size would produce. This is due to the larger radii of curvature providing a substantially flat surface in center region 40, resulting in less distortion in the reflected image, while the smaller radii of curvature near its outer edges providing a more substantially curved surface, which results in the reflected image being compressively distorted, as the greater curved surface reflects a larger amount of scenic information from a given amount of surface area.

Convex reflector 14 is oriented on vehicle 12 its reflective surface facing generally downwardly such that the critical area immediately rearward of the vehicle reflects from curved reflective surface 34 at center region 40 and forward region 77, while the area rearward of vehicle 12 that is closer to the horizon, represented generally by line 78 in FIG. 2, reflects from curved reflective surface 34 at rearward region 79 of outer edges 42. Similarly, the areas on either side of vehicle 12 reflect from curved reflective surface 34 at side regions 80 of outer edges 42. Due to the varying radii of curvature, the overall reflected image 28, especially in the critical regions immediately rearward of vehicle 12, includes substantially less distortion than an image reflected from a standard symmetrical and spherical or parabolic reflector, while still providing a wide-angle field of view.

Convex reflector 14 of the preferred embodiment, therefore, provides a broad field of view of the area immediately rearward of vehicle 12, as shown in FIG. 10. The area included in reflected image 28 preferably extends from substantially directly downward, as represented by line 82, including a vehicle body reference, such as a rear portion 72 of a rear bumper 74 of vehicle 12, up to an upper level 84 just above horizon 78. The shape of curved reflective surface 34 is designed to provide a minimal amount of distortion of the body reference and in the critical areas immediately rearward thereof, while allowing a greater amount of distortion in the area near the horizon 78 and side regions 86 and 88 of the image where the scenic information is less critical to the operator. Such an image, with varying degrees of distortion, is reflected toward image capture device 20 due to the orientation and asymmetry of curved reflective surface 34.

It is further envisioned that the image capture system may include electronic image processing or distortion correction to further correct the image. The objective being to display a vehicle reference, such as a front or rear bumper or side of the vehicle, depending on the location of the image capture system, as is seen outside the vehicle, so as to provide a sense of correctness to the image displayed to the driver. For example, an image processing algorithm may be provided which ensures that straight horizontal and/or vertical lines in the scenic information exteriorly of the vehicle are displayed as straight horizontal and/or vertical lines in the image displayed on display 26. Such processing allows the image capture system to implement a spherical reflector or the like, or even a refractive lens camera with a wide angle lens, and still provide a substantially realistic display image to the driver.

Image capture device 20 receives reflected image 28 from convex reflector 14. Preferably, image capture device is oriented relative convex reflector 14 off of axis 35 of convex reflector 14, such that the image received by image capture device 20 does not include a reflection of image capture device 20 itself. Although various camera devices may be utilized, a pixelated-imaging array is preferred for image capture device 20. An example of such an imaging array is a CMOS imaging array or the like, a detailed description of which is disclosed in commonly assigned U.S. Pat. No. 5,670,935, issued to Schofield et al., the disclosure of which is hereby incorporated herein by reference. However, other devices such as CCD may also be used. The preferred image capture device 20 is a low cost camera device, yet still provides an effective means for receiving reflected image 28. Image capture device 20 may be fixedly secured within rear panel 24 or other panels of vehicle 12, or may be movable, such as by a joystick or the like, to provide the driver with a different view point if desired. Furthermore, the image capture device may include a remotely operable zoom lens and/or variable focus or the like. Alternatively, the camera may be fixed, while the ability to pan or zoom within the wide field of view captured by the image capture device may be provided by electronic image processing of the image displayed to the driver. Image capture device 20 may also be connected to an image recording system to allow the driver to record the events occurring rearward of the vehicle. Additionally, the image capture device 20 may also measure the contrast ratio of the exterior scene to determine when visibility conditions change around the vehicle. The image capture system may then provide a warning to the driver to slow down as visibility decreases. The warning may be provided in the display or elsewhere within vehicle 12 as a visual or audio communication. Because drivers tend to drive faster as the scenic information becomes less visible, as they lose reference to ground movements and cannot readily discern how fast they are driving, such a warning system reduces the likelihood that the driver will increase the speed of the vehicle as conditions worsen.

Display 26 is positioned within vehicle 12 for easy viewing of the display by the operator of vehicle 12. The display may be a liquid crystal display (LCD) or the like, and displays an image as received from image capture device 20. Preferably, display 26 displays the image at a focal length that is forward of the vehicle passenger compartment, as disclosed in published PCT application, international publication WO 96/38319, published Dec. 5, 1996, the disclosure of which is hereby incorporated herein by reference.

A redirecting element, which is preferably a substantially flat reflective surface 16 may be included in the image capture system along the optic path to receive reflected image 28 from convex reflector and redirect this image toward image capture device 20. Reflective surface 16 may be a metallized surface an may further be a first or second surface reflector, as discussed above with respect to convex reflector 14. Reflective surface 16, may be rigidly mounted within recess 22 of rear panel 24 such that reflective surface 16 is oriented off-axis from axis 35 of convex reflector 14, and is oriented to redirect the downwardly projected image from convex reflector 14 upward and slightly forward into recess 22. This allows for easier packaging of image capturing system 12 by limiting the vertical space required while also requiring only a minimal amount of additional forward space in recess 22. However, reflective surface 16 may be oriented to redirect the image in other directions, such as to one side or another, toward a correspondingly positioned image capture device, in order to satisfy the vehicle packaging requirements. Furthermore, by redirecting reflected image 28 with reflective surface 16, the possibility of stray light being received by image capture device 20 is greatly reduced, as discussed further below.

A corrective element, which is preferably a diffractive lens 18, may also be located along the optic path between convex reflector 14 and image capture device 20. Diffractive lens 18 corrects the color focusing within the reflected image. Diffractive lens 18 is preferably a plastic diffractor which is a low cost yet effective means to correct for color aberrations in the reflected image. However, diffractive lens 18 may instead be a two-element acromat or the like. Diffractive lens 18 may further include an aspheric refractive lens element 58 attached thereto to further correct for distortions and aberrations within redirected image 30. In the illustrated embodiment, refractive lens element 58 is a transparent plastic lens element, having a varying width, such that the image passing through refractive lens 58 is refracted in varying degrees, corresponding to the magnitude of distortion in the image received by refractive lens 58. Therefore, either by itself, or in conjunction with image capture device 20, refractive lens 58 functions as a means for correcting distortions within the image.

Figure 11:
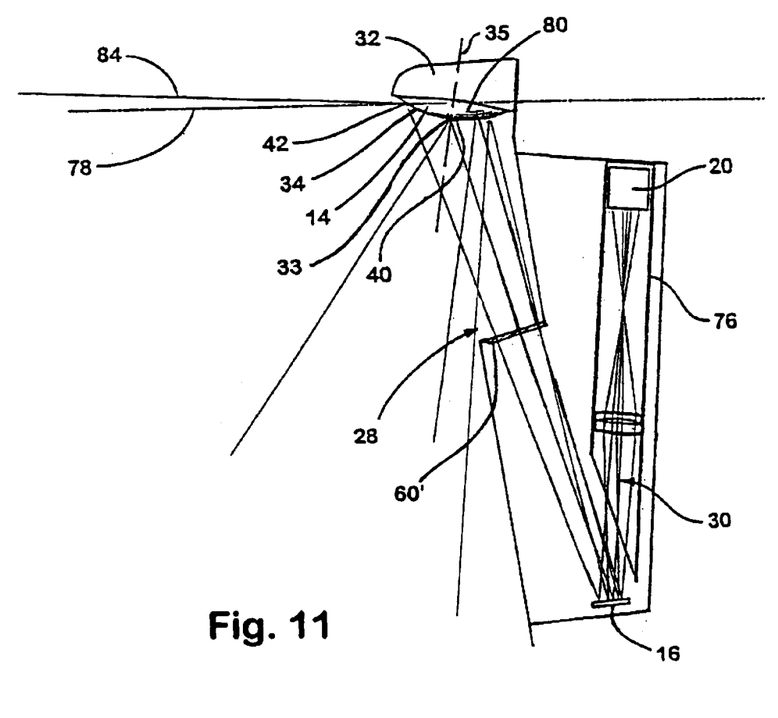
FIG. 11 is the same view of FIG. 2 of another alternate embodiment of the invention.
Figure 12:
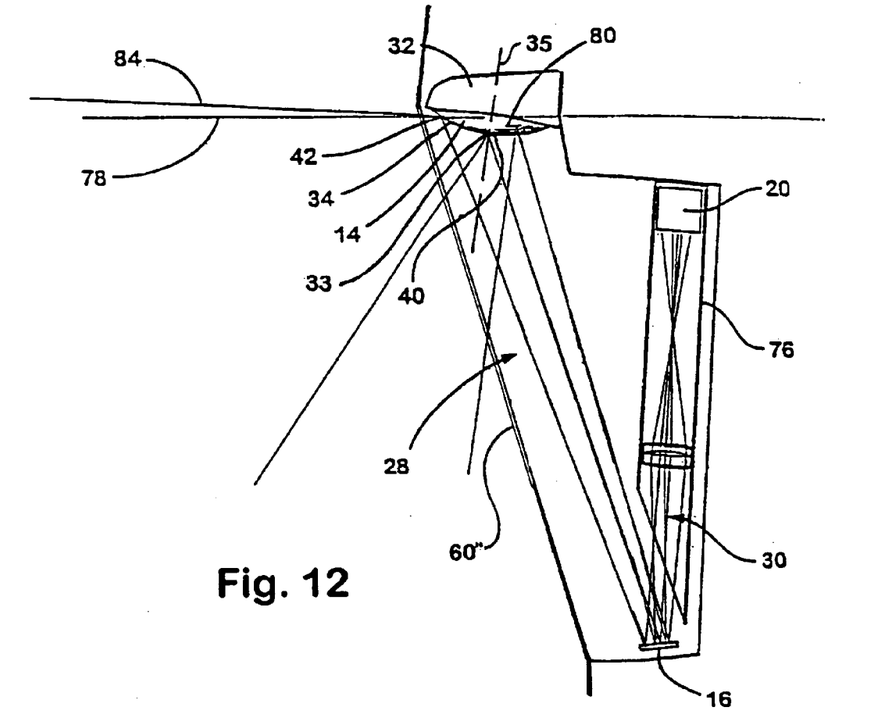
FIG. 12 is the same view of FIG. 2 of another alternate embodiment of the invention.

A cover glass or transparent panel 60 is positioned along a rearward surface 62 of rear panel 24, and encases reflective surface 16, diffractive lens 18 and image capture device 20 within recess 22 of vehicle 12, thereby protecting them from outside road and weather conditions, while passing the light rays into the trunk. Transparent panel 60 is substantially coplanar with rearward surface 62 and allows reflected image 28 to enter recess 22 and be received by reflective surface 16. Transparent panel 60 has an upper edge 64 and a lower edge 66, and is of a size such that only the desired image reflected downward from convex reflector 14 is received and redirected by reflective surface 16. Rays of light 68, representing upper edge 84 of the rearward image, enter recess 22 through transparent panel 60 just above lower edge 66, while rays of light 70, representing lower edge 82 of the desired rearward image, enter recess 22 just below upper edge 64 of transparent panel 60. Other light entering recess 22 at an angle directed toward reflective surface 16, that is outside the desired range of the rearward view, is substantially reduced by non-transparent rear panel 24. Transparent panel 60 may be substantially vertical and coplanar with the vehicle panel or may alternatively be substantially horizontal to allow the reflected image to reflect downward, through the panel (FIG. 11). By orienting the transparent panel 60' substantially perpendicular to the rays of light reflecting from convex reflector 14, glare and scattering of light on the panel is substantially reduced. Alternatively, a transparent panel 60" may further encase convex reflector 14 within the vehicle panel (FIG. 12).

Image capture device 20 and diffractive lens 18 are further encased within baffles or blinds, represented generally by 76, to minimize any additional stray light from being received by or reflected within image capture system 10. Baffles 76 reduce the amount of stray light, as represented generally by line 75 in FIG. 2, from entering recess 22 at an angle which is not toward reflective surface 16, and thus from reflecting within diffractive lens 18 and image capture device 20. Therefore, the primary light received by image capture device 20 is light constituting the desired rearward image reflected by convex reflector 14 via reflective surface 16. Other light is shielded from image capture device 20 due to rear panel 24, baffles 76, and the orientation of reflective surface 16, thereby greatly reducing the likelihood of glare within the captured image.

After the image has reflected from convex reflector 14 and redirected from reflective surface 16, it is received by image capture device 20 and communicated to display 26. The off-axis orientation of the asymmetric convex reflector 14 and image capture device 20 allows convex reflector 14 to direct an image toward image capture device 20, via reflective surface 16, that does not include a reflection of image capture device 20. The signal from image capture device 20 to display 26 may be communicated over any form of transmission including fiber optic cables or the like.

Figures 8, 9:
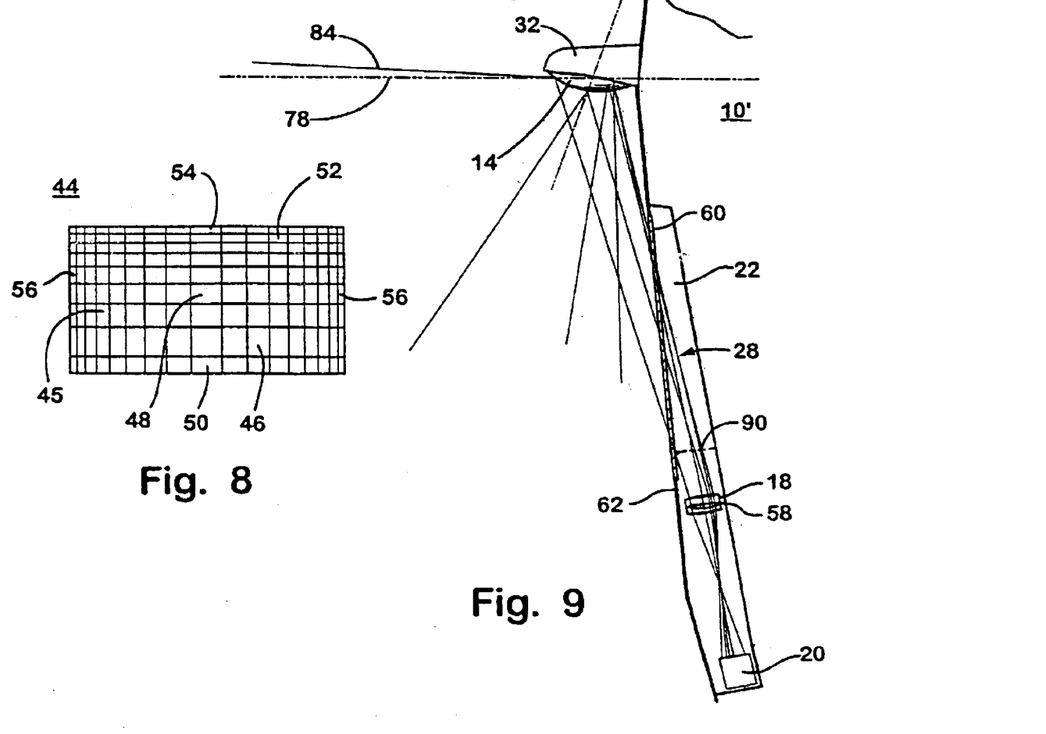
FIG. 8 is a view taken along the line VIII—VIII in FIG. 7.
FIG. 9 is the same view of FIG. 1 of another alternate embodiment of the invention.

In an alternate embodiment, such as that shown in FIG. 7, an image capture device 20' is capable of reducing distortion of the captured image. In the illustrated embodiment, this is accomplished by a non-uniform array 44 of electro-optic pixels 45, as shown in FIG. 8. Non-uniform array 44 has a coarse distribution of pixels 46 in a center region 48 and a lower region 50, while having a finer distribution of pixels 52 along an upper edge 54 and side regions 56. This non-uniform pixilation of array 44 receives reflected image 28 and varies correspondingly with the magnitude of distortion in reflected image 28 from convex reflector 14. An example of non-uniform pixelated arrays is disclosed in commonly assigned U.S. Pat. No. 5,796,094, issued to Schofield et al., the disclosure of which is hereby incorporated herein by reference. The received image is then communicated to display 26, which includes a uniform array of display pixels (not shown), corresponding to non-uniform array 44, for simultaneously displaying the image captured by non-uniform array 44. The combination of the non-uniform pixilation of array 44 and the uniform pixilation of display 26 has the effect of reducing distortion of reflected image 28 as would be apparent to the skilled artisan. More particularly, center region 48 and lower region 50 of non-uniform array 44 receive portions of reflected image 28 that are reflected from center region 40 and forward region 77 of convex reflector 14, where the distortion is minimized. Conversely, the finer distribution of pixels 52 on non-uniform array 44 receive portions of reflected image 28 having greater distortion, which are reflected from outer edges 42 of convex reflector 14 and represent upper area 84 and side regions 86 and 88 of the scene rearward of vehicle 12. Therefore, when finer pixel distribution 52 is communicated and synthesized onto the uniform array, the image received by finer pixels 52 is expanded, thereby correcting for the compressive distortion in these areas of the image. While this may require some interpolation between finer pixels 52, the resultant image displayed to the vehicle operator, as shown in FIG. 10, has reduced distortion, especially in the critical areas, without extensive electronic processing of the image or requiring additional refractive lens elements. It should be understood that the distribution of pixels is selected to remove distortion from the reflected image and may be different for different reflector designs.

In another alternate embodiment, shown in FIG. 9, a wide-angle image capture system 10' is provided without a substantially flat reflective surface. Image capture system 10' includes a reflector 14, and an image capture device 20 and diffractive lens 18, which are positioned along an optical path extending downward from reflector 14 into rear panel 24 of vehicle 12. The focal length of image capture system 10', which is the distance between reflector 14 and image capture device 20, is substantially the same as the focal length of image capture system 10. This focal length requires that image capture device 20 and diffractive lens 18 of image capture system 10' extend further downward into rear panel 24 than the components of image capture system 10.

Although the illustrated embodiments preferably include a convex reflector having an asymmetric, aspheric reflective surface, other alternate embodiments may be provided. One such alternative includes a spherical reflective surface. Such a surface may be economically defined by a portion of a polished ball bearing (not shown). Spheric or parabolic shaped reflectors such as these may provide for even lower cost components for the system, as they may be made from standard, readily available parts. However, as discussed above, images reflecting from such reflectors have greater overall distortion then images reflecting from convex reflector 14 of the preferred embodiment. This additional distortion may require further processing of the reflected image prior to it being displayed on display system 26 within vehicle 12.

Because it may be difficult for a driver to precisely judge distances between the vehicle and an object shown in the display 26, a ranging device 94 may be included in an image capture system (FIG. 13). The ranging device 94 measures the distance to an object positioned exteriorly of the vehicle and a signal may then be communicated to the driver regarding the proximity of the object. The ranging device may be ultrasonic, radar, stereo imaging or the like, with the distances measured being displayed on the display. Alternatively, the proximity of the object may be linked to the color or flashing of the display or an auxiliary display, or to an intensity or rate of an audio signal or tone. It is further envisioned that such a ranging device and signal may be implemented in a refractive lens camera system as well as the reflective system of the present invention.

In order to provide the driver with scenic information when ambient lighting conditions are low, the image capture system may include a rearward flood light or other illumination source 96 to provide illumination to the desired area (FIG. 13). The illumination source 96 may be an incandescent or non-incandescent light such as a solid state light emitting diode (LED), electro-illuminescent material or the like, and may provide visible light or near-infrared or non-visible infrared illumination. The image capture device may further include a material which is efficient in detecting near-infrared radiation, while the convex reflector, and flat reflective surface if applicable, may also be efficient in reflecting such radiation.

Because visible rearward lighting may annoy drivers of other vehicles, the illumination source 96 preferably emits illumination in the near-infrared region, such as 0.7 microns to 2.5 microns of the electro magnetic radiation spectrum or beyond. This near-infrared illumination may provide visibility in low ambient lighting conditions while reversing, while avoiding potential annoyance of other drivers. Preferably, the illumination source 96 will only be activated at times when it is needed. For example, the illumination source may be locked out whenever the vehicle ignition is on, unless the reverse gear is also activated. Additionally, a photo-sensor control may be included in the wide angle image capture system to allow for activation of the illumination source only in low ambient light conditions. A photo-sensor may be positioned at various locations on or within the vehicle, such as, for example, on the image capture device itself. The output of the photo-sensor and the status of the reverse gear and/or vehicle ignition may be considered separately or in combination to determine whether the illumination source may be activated. Although discussed with respect to the reflective system of the present invention, application of the illumination source is not intended to be limited to such a system, and may alternatively be implemented with a refractive lens camera system.

A control device may also be provided to drive a configurable instrument panel within the vehicle. The control may be a track ball type device, or other manual control device such as a joystick, touchpad or the like, which allows the driver to easily manipulate a visual menu in the instrument panel or to change the display image. Alternatively, the control device may drive a voice menu, which allows the driver to navigate the menu by voice without taking the driver's attention from the road. The menu may include controls for a radio, cabin temperature or the like. It is further envisioned that such a device may be implemented in either a reflective image capture system or a refractive lens and camera system.

Therefore, it is seen that a vehicular vision system is disclosed which comprises a minimal number of components and which allows for a compact packaging of the system. Due to the shape of the convex reflector, the present invention does not require a wide-angle lens and several additional glass refractive lenses to correct for distortion. This results in a low-cost system having only the minimal number of components, none of which are expensive glass lenses or the like. Furthermore, by implementing the flat reflective mirror to re-direct the reflected image toward the image capture device, the present invention not only reduces the affect of stray light on the system, but also minimizes the amount of space required for packaging. Instead of requiring a cylindrical column protruding forward into the space within a portion of the vehicle, the present invention merely rests within a small recess along a portion of the vehicle.

The shape of the convex reflector of the present invention also reduces the amount of processing required to result in a substantially non-distorted image being communicated to the display screen. Furthermore, due to the off-axis orientation of the image capture device from the convex reflector, the present invention avoids the blind spot in the center of the reflected image, as the reflector is angled slightly rearward, and the image capture device is oriented such that the reflected image received by the image capture device does not include a reflection of the image capture device itself. This not only avoids a blind spot, but further reduces the amount of processing required to remove the reflection from the image.

Similarly, other aspects of the present invention function to provide a substantially non-distorted view of the area immediately rearward of the vehicle without requiring extensive electronic processing of the image. In particular, a diffractive lens element may be included to provide optimal focusing of the colors on the image capture device. In addition, a refractive lens element 58 may be positioned adjacent the diffractive lens to also correct for some of the distortion in the image before it is received by the image capture device. These elements also minimize other aberrations within the image, such as coma and astigmatism.

In order to correct for the remaining distortion in the image as it is received by the image capture device, the image capture device incorporates image distortion correction without implementing costly electronic processing devices and algorithms. The image capture device, which is preferably a CMOS imaging array or the like, may include an imaging array that is a non-uniform distribution of image capturing pixels. By receiving the distorted image on a non-uniform array, the image is then substantially corrected by electronically reproducing the captured image on a uniform array on the display of the present invention.

The wide-angle image capture system of the present invention therefore provides a low cost system for providing rearward scenic information of an area directly rearward of vehicle with a minimal number of components, as compared to typical proposed systems requiring up to six or more lens elements. Furthermore, none of the components of the present invention are expensive, multi-element optical elements, thus further reducing the costs relative typical systems, while increasing the durability of the system. Further, due to the fact that wide-angle image capture system extends downward within a rear panel of the vehicle 12, both packaging and durability concerns for this system are greatly improved upon over typical horizontally extending systems that extend forward into the trunk space of the vehicle.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property right or privilege is claimed are defined as follows:

1. A vehicular vision system, comprising:
   a reflector fixedly attached at a portion of a vehicle for reflecting an image occurring exteriorly of the vehicle, said reflector having a reflector field of view exterior of the vehicle, said reflector field of view encompassing a view of a road portion and vehicles or objects thereon, said reflector field of view having a first principal axis;
   an image capture device fixedly attached at the portion of the vehicle, said image capture device having an image capture device field of view, said image capture device being oriented such that said image capture device field of view encompasses said image reflected from said reflector, said reflector and said image capture device defining an optical path therebetween and being oriented relative to one another such that the optical path is directed off of said first principal axis of said reflector so that the image captured by said image capture device does not include a reflection of the image capture device; and
   a display system which displays an image from an output of said image capture device, said display system including a display viewable by a driver of the vehicle when the driver is operating the vehicle.

2. The vision system of claim 1, wherein at least one of said image capture device and said display system are occasionally activated in response to one of an input from one of a driver and the vehicle.

3. The vision system of claim 2, wherein said input is provided by one of an audible message from the driver and an engagement of a reverse gear of the vehicle.

4. The vision system of claim 1, wherein the image displayed by said display system includes a vehicle body reference therein.

5. The vision system of claim 4, wherein said reflector is positioned at a rearward portion of the vehicle, said image capture device capturing an image of an area rearwardly of the vehicle, said vehicle body reference comprising a rear bumper of the vehicle.

6. The vision system of claim 1, wherein said reflector is positioned at an exterior rear portion of the vehicle and said image capture device is positioned at an interior rear portion of the vehicle.

7. The vision system of claim 1, wherein at least one of said reflector and said image capture device are positioned at one of a rear spoiler of the vehicle, a rim molding of a window of the vehicle, a badge of the vehicle and a license plate holder of the vehicle.

8. The vision system of claim 1, wherein said reflector has a metallized reflective surface.

9. The vision system of claim 8, wherein said metallized reflective surface is one of chromium, aluminum, silver, stainless steel and titanium.

10. The vision system of claim 1, wherein said reflector is one of a first surface reflector and a second surface reflector.

11. The vision system of claim 1, wherein said reflector includes a heating element.

12. The vision system of claim 11, wherein said heating element is one of an indium tin oxide conductor, a doped tin oxide and a conductive mesh.

13. The vision system of claim 1, wherein said reflector is coated with at least one of an anti-soiling material and anti-wetting material.

14. The vision system of claim 1, further including a mirrored surface positioned in an optic path from said reflector to said image capture device and adapted to redirect the reflected image toward said image capture device.

15. The vision system of claim 1, further including a diffractive element positioned in an optic path from said reflector to said image capture device, whereby said diffractive element adjusts for at least color distortions in the reflected image.

16. The vision system of claim 1 further including a corrective optic positioned in an optic path between said reflector and said image capture device, whereby said corrective optic at least reduces distortions and aberrations within the reflected image.

17. The vision system of claim 16, wherein said corrective optic is an aspheric refractive lens between said reflector and said image capture device.

18. The vision system of claim 1, wherein said vehicular vision system is connected to an image recording system to occasionally record events occurring exteriorly of the vehicle.

19. The vision system of claim 1, wherein said vehicular vision system measures a contrast ratio of the image occurring exteriorly of the vehicle to determine when visibility conditions change.

20. The vision system of claim 19, wherein said vehicular vision system communicates information to a driver of the vehicle which varies according to the contrast ratio.

21. A vehicular vision system comprising:
an image capturing system that captures an image of an area exteriorly of a vehicle, wherein said image capturing system comprises a reflector included at a portion of the vehicle, said portion of the vehicle also including an image capture device of said image capturing system, said reflector having a reflector field of view and being fixedly positioned such that said reflector field of view encompasses an area exteriorly of the vehicle, said reflector having a principal axis and reflecting a reflected image of the area, said image capture device being fixedly attached at said portion of the vehicle and having an image capture device field of view encompassing said reflected image, said image capture device being operable to receive said reflected image of the area exteriorly of the vehicle, said reflector and said image capture device defining an optical path therebetween and being oriented relative to one another such that the optical path is directed off of said principal axis of said reflector so that the image received by said image capture device does not include a reflection of the image capture device; and a display positioned within the vehicle and displaying an image, said image comprising an output of said image capture device of said image capturing system, said display being viewable by a driver of the vehicle when the driver is operating the vehicle.

22. The vehicular vision system of claim 21, wherein said reflector is included on the portion of the vehicle and said image capture device is included within the portion of the vehicle.

23. The vehicular vision system of claim 21, wherein said reflector comprises a reflective surface which is curved outwardly about a generally central axis thereof.

24. The vehicular vision system of claim 23, wherein said reflector is one of a paraboloid shape, a hemispherical shape and a hyperboloid shape.

25. The vehicular vision system of claim 24, wherein said reflector is a portion of a spherical ball bearing.

26. The vehicular vision system of claim 23, wherein said field of view extends horizontally at least 140 degrees.

27. The vehicular vision system of claim 23, wherein said reflector is positioned at a rear portion of the vehicle, said field of view capturing an image which includes a portion of a rear bumper of the vehicle and extends upward to above said substantially horizontal line extending from said rearward edge of said reflector.

28. The vehicular vision system of claim 23, wherein said reflector defines at least one surface having varying radii of curvature.

29. The vehicular vision system of claim 28, wherein said varying radii of curvature vary in length between approximately one inch and 200 inches.

30. The vehicular vision system of claim 14, wherein said reflector defines an axis generally centrally thereof, said at least one surface being determined by the equation:

$$z = \frac{c_x x^2 + c_y y^2}{1 + \sqrt{1 - (1+k_x)c_x^2 x^2 - (1+k_y)c_y^2 y^2}}; \quad c_x = \frac{1}{r_x}; \quad c_y = \frac{1}{r_y};$$

wherein z is an axis of rotation of said reflector, x and y are x and y coordinates of a point on said reflector, $r_x$ is a radius of curvature along an x-axis, $r_y$ is a radius of curvature along a y-axis, and $k_x$ and $k_y$ are constants.

31. The vehicular vision system of claim 21, wherein said reflector provides a reflection with a minimal amount of distortion at a bottom portion and a center portion of the reflected image and with slightly greater distortion along an upper portion of the reflected image.

32. The vehicular vision system of claim 1, wherein said reflector comprises a curved reflective surface.

33. A vehicular vision system comprising:

a reflector having a curved reflective surface and a principal axis thereof, said reflector being fixedly attached at a portion of a vehicle and having a reflector field of view encompassing a view of a road portion and vehicles or objects thereon;

an image capture device fixedly attached at the portion of the vehicle and operable to receive an image reflected from said reflector, said image capture device having an image capture device field of view, said image capture device being oriented such that said image capture device field of view encompasses said reflected image reflected from said reflector, said reflector and said image capture device defining an optic path therebetween and being oriented such that said optic path is directed off of said principal axis of said reflector so that the image captured by said image capture device does not include a reflection of the image capture device; and a display system which displays a synthesized image from an output of said image capture device, said display system including a display viewable by a driver of the vehicle when the driver is operating the vehicle.

34. The vision system of claim 33 further including a reflective surface positioned along said optic path, said reflective surface redirecting an image reflected from said reflector toward said image capture device.

35. The vision system of claim 33 further including a corrective optic positioned along said optic path, said corrective optic correcting distortion and aberrations within the image reflected from said reflector.

36. The vision system of claim 33, wherein said reflector is mounted at a rear portion of the vehicle, said reflector reflecting an image occurring rearward of the vehicle.

37. The vision system of claim 33, wherein said reflector is mounted on an exterior surface of the vehicle and said image capture device is mounted interiorly of said exterior surface, said exterior surface including a transparent portion through which the reflected image is projected toward said image capture device.

38. A vehicular vision system comprising:

a reflector fixedly attached at a portion of a vehicle for reflecting an image of an exterior scene exterior of the vehicle, said reflector having a reflector field of view encompassing the exterior scene, said reflector comprising a curved reflective surface which provides a reflection with a minimal amount of distortion at a bottom portion and a center portion of the reflected image and with slightly greater distortion along an upper portion of the reflected image, said reflector having a reflective surface that has a principal axis;

an image capture device which is adapted to receive the reflected image, said image capture device being fixedly attached at the portion of the vehicle and having an image capture device field of view;

a mirrored surface positioned along an optic path between said reflector and said image capture device, said mirrored surface having a mirror field of view encompassing the reflected image reflected by said reflector, said mirrored surface redirecting the reflected image toward said image capture device, said image capture device field of view encompassing the redirected image from said mirrored surface, said optic path being off of said principal axis at said reflective surface so that the image received by said image capture device does not include a reflection of the image capture device; and a display system which displays an image from an output of said image capture device, said display system including a display viewable by a driver of the vehicle when the driver is operating the vehicle.

39. The vision system of claim 38 further including a corrective optic positioned along said optic path, said corrective optic reducing distortion and aberrations within the reflected image.

40. The vision system of claim 38 further including a diffractive lens positioned along said optic path, said diffractive lens correcting color focusing on the reflected image.

41. The vision system of claim 38, wherein said reflector is positioned on an exterior portion of a vehicle, and said reflective surface and said image capture device are positioned interiorly of the exterior portion of the vehicle.

42. The vision system of claim 41, wherein said mirrored surface is positioned substantially below said reflector and said image capture device such that said reflector reflects an image substantially downward toward said mirrored surface and said mirrored surface reflects the image upward toward said image capture device.

43. The vision system of claim 41, wherein said mirrored surface is positioned substantially toward a side of the vehicle relative to said reflector and said image capture device such that said reflector reflects-an image substantially sidewardly toward said mirrored surface and said mirrored surface reflects the image sidewardly toward said image capture device.

44. The vision system of claim 38, further including a second reflector oriented substantially opposite said reflector and a second mirrored surface positioned along a second optic path between said second reflector and said image capture device, said reflector and said second reflector reflecting discontinuous images toward said image capture device.

45. The vision system of claim 44, wherein said reflector and said second reflector are positioned on a rearward portion of the vehicle and each one oriented to reflect an image of an area which is downward and substantially toward a side of the vehicle, said reflector reflecting an image of an area at one side and said second reflector reflecting an image of an area at another side of the vehicle.

46. The vision system of claim 45, wherein said reflector and said second reflector are positioned on a forward portion of the vehicle and each one oriented to reflect an image of an area which is downward and at a side of the vehicle.

* * * * *

UNITED STATES PATENT AND TRADEMARK OFFICE
CERTIFICATE OF CORRECTION

| | | |
|---|---|---|
| PATENT NO. | : 6,717,610 B1 | Page 1 of 1 |
| APPLICATION NO. | : 09/199907 | |
| DATED | : April 6, 2004 | |
| INVENTOR(S) | : Bos et al. | |

It is certified that error appears in the above-identified patent and that said Letters Patent is hereby corrected as shown below:

Column 2
Line 7, delete "," after "and"

Column 3
Line 40, delete "-" after "along"

Column 14
Claim 30, Line 51, "14" should be --21--

Column 16
Claim 43, Line 35, delete "-" after "reflects"
Claim 47, Line 57, Insert --47. The vision system of claim 33, wherein said image capture device is substantially encased by at least one of baffles and blinds to substantially reduce stray light that is received by said image capture device.--

Signed and Sealed this

Fourth Day of September, 2012

David J. Kappos
*Director of the United States Patent and Trademark Office*

UNITED STATES PATENT AND TRADEMARK OFFICE
CERTIFICATE OF CORRECTION

PATENT NO. : 6,717,610 B1
APPLICATION NO. : 09/199907
DATED : April 6, 2004
INVENTOR(S) : Bos et al.

Page 1 of 2

It is certified that error appears in the above-identified patent and that said Letters Patent is hereby corrected as shown below:

Delete the title page and substitute therefore the attached title page showing the corrected number of claims in patent.

Column 2
Line 7, delete "," after "and"

Column 3
Line 40, delete "-" after "along"

Column 14
Claim 30, Line 51, "14" should be --21--

Column 16
Claim 43, Line 35, delete "-" after "reflects"
Claim 47, Line 57, Insert --47. The vision system of claim 33, wherein said image capture device is substantially encased by at least one of baffles and blinds to substantially reduce stray light that is received by said image capture device.--

This certificate supersedes the Certificate of Correction issued September 4, 2012.

Signed and Sealed this
Ninth Day of October, 2012

David J. Kappos
*Director of the United States Patent and Trademark Office*

(12) United States Patent
Bos et al.

(10) Patent No.: US 6,717,610 B1
(45) Date of Patent: Apr. 6, 2004

(54) WIDE ANGLE IMAGE CAPTURE SYSTEM FOR VEHICLE

(75) Inventors: Brent J. Bos, Tucson, AZ (US); Kenneth Schofield, Holland, MI (US); Mark L. Larson, Grand Haven, MI (US)

(73) Assignee: Donnelly Corporation, Holland, MI (US)

(*) Notice: Subject to any disclaimer, the term of this patent is extended or adjusted under 35 U.S.C. 154(b) by 0 days.

(21) Appl. No.: 09/199,907

(22) Filed: Nov. 25, 1998

(51) Int. Cl.$^7$ ............................. H04N 7/18; H04N 9/47
(52) U.S. Cl. ..................... 348/148; 340/436; 340/901; 348/30; 348/335
(58) Field of Search .................... 348/148, 30, 335; 340/436, 901

(56) References Cited

U.S. PATENT DOCUMENTS

| | | | |
|---|---|---|---|
| 3,947,095 A | 3/1976 | Moultrie | 350/302 |
| 4,214,266 A | 7/1980 | Myers | 358/108 |
| 4,264,144 A * | 4/1981 | McCord | 350/293 |
| 4,277,804 A | 7/1981 | Robison | 358/108 |
| 4,626,850 A | 12/1986 | Chey | 340/903 |
| 4,892,345 A | 1/1990 | Rachael, III | 296/24.1 |
| 4,937,796 A | 6/1990 | Tendler | 367/116 |
| 5,121,200 A | 6/1992 | Choi | 358/103 |
| 5,406,395 A | 4/1995 | Wilson et al. | 359/15 |
| 5,414,461 A | 5/1995 | Kishi et al. | 348/115 |
| 5,574,443 A * | 11/1996 | Hsieh | 340/601 |
| 5,648,835 A | 7/1997 | Uzawa | 396/429 |
| 5,670,935 A | 9/1997 | Schofield et al. | 340/461 |
| 5,680,123 A * | 10/1997 | Lee | 340/937 |
| 5,760,826 A * | 6/1998 | Nayar | 348/36 |
| 5,760,828 A | 6/1998 | Cortes | 348/143 |
| 5,793,542 A | 8/1998 | Kondo et al. | 359/864 |
| 5,796,094 A | 8/1998 | Schofield et al. | 250/208.1 |
| 6,115,651 A * | 9/2000 | Cruz | 701/1 |
| 6,175,300 B1 * | 1/2001 | Kendrick | 340/436 |
| 6,226,035 B1 * | 5/2001 | Korein | 348/355 |
| 6,304,285 B1 * | 10/2001 | Geng | 348/36 |

FOREIGN PATENT DOCUMENTS

| | | |
|---|---|---|
| DE | 2931368 A1 | 2/1981 |
| DE | 3248511 A1 | 7/1984 |
| EP | 0416222 A2 | 3/1991 |
| EP | 0513476A A1 | 11/1992 |
| FR | 2241085 | 3/1975 |
| FR | 25285991 | 2/1987 |
| FR | 2673499 | 9/1992 |

(List continued on next page.)

OTHER PUBLICATIONS

Commonly assigned, co–pending U.S. patent application, Ser. No. 08/952,026 Filed Nov. 19, 1997 by Schofield et al., entitled Rearview Vision System For Vehicle Including Panoramic View.

(List continued on next page.)

Primary Examiner—Andy Rao
Assistant Examiner—Charles Parsons
(74) Attorney, Agent, or Firm—Van Dyke, Gardner, Linn & Burkhart, LLP (57) ABSTRACT

A wide-angle image capture system for providing a wide-angle field of view of an area immediately exteriorly of a vehicle. The system includes a convex aspheric, asymmetric reflective surface which reflects an image toward an image capture device, via a substantially flat mirrored surface, both of which are compactly packaged within a panel of the vehicle. The shape of the convex reflector provides a reflected image that has a minimal amount of distortion in critical areas of the image immediately adjacent to the vehicle, so that additional processing of the image prior to it being displayed to a vehicle operator is minimized.

47 Claims, 5 Drawing Sheets